US011125729B2

(12) United States Patent
Jung et al.

(10) Patent No.: US 11,125,729 B2
(45) Date of Patent: Sep. 21, 2021

(54) PURIFICATION ELEMENTS FOR DISPENSING A PURIFIED LIQUID (71) Applicant: Waters Technologies Corporation, Milford, MA (US)

(72) Inventors: Moon Chul Jung, Waltham, MA (US); Abhijit Tarafder, Franklin, MA (US); Wade P. Leveille, Douglas, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 4 days.

(21) Appl. No.: 16/223,330

(22) Filed: Dec. 18, 2018

(65) Prior Publication Data
US 2019/0187109 A1 Jun. 20, 2019

Related U.S. Application Data (60) Provisional application No. 62/607,676, filed on Dec. 19, 2017.

(51) Int. Cl.
G01N 30/14 (2006.01)
G01N 30/32 (2006.01)
G01N 30/34 (2006.01)
B01D 15/18 (2006.01)
B01D 15/26 (2006.01)
G01N 1/34 (2006.01)

(52) U.S. Cl.
CPC ............. *G01N 30/14* (2013.01); *B01D 15/18* (2013.01); *B01D 15/26* (2013.01); *G01N 30/32* (2013.01); *G01N 30/34* (2013.01); *G01N 1/34* (2013.01); *G01N 2030/143* (2013.01); *G01N 2030/342* (2013.01)

(58) Field of Classification Search
CPC .................. B01D 35/027; B01D 2221/02
USPC ........................... 210/464, 466, 468
See application file for complete search history.

(56) References Cited

U.S. PATENT DOCUMENTS

| 5,505,120 | A | 4/1996 | Albertson | |
| 2003/0164333 | A1* | 9/2003 | Nohren, Jr. | .......... B01D 63/024 210/650 |
| 2013/0134079 | A1 | 5/2013 | Jarrell et al. | |
| 2014/0224658 | A1* | 8/2014 | Richardson | ............ B01D 46/40 204/630 |

(Continued)

FOREIGN PATENT DOCUMENTS

| CN | 10734049 A | 11/2017 |
| EP | 1101080 B1 | 5/2008 |
| JP | 09113494 | 5/1997 |

OTHER PUBLICATIONS

Application No. PCT/US2018/066171, International Search Report and the Written Opinion of the International Searching Authority, or the Declaration dated May 7, 2019.

(Continued)

*Primary Examiner* — Benjamin M Kurtz
(74) *Attorney, Agent, or Firm* — Schmeiser, Olsen & Watts LLP; Victor J. Baranowski (57) ABSTRACT In various aspects provided are purification media and containers for dispensing a purified liquid are provided herein where a high surface area-to-volume chemically interactive purification media positioned at the outlet of a container that purifies the liquid as it is dispensed and/or extracted.

10 Claims, 10 Drawing Sheets (56) References Cited

U.S. PATENT DOCUMENTS

2017/0165591 A1   6/2017   Jackson et al.

OTHER PUBLICATIONS

International Preliminary Report on Patentability for corresponding PCT Patent Application No. PCT/US2018/066171 dated Jul. 2, 2020. 8 pages.

* cited by examiner

PURIFICATION ELEMENTS FOR DISPENSING A PURIFIED LIQUID

RELATED APPLICATIONS

This application is a non-provisional patent application claiming priority to U.S. Provisional Patent Application No. 62/607,676, filed Dec. 19, 2017, entitled "Purification Elements For Dispensing A Purified Liquid," which is incorporated herein by reference.

FIELD OF THE INVENTION

The invention relates generally to the purification of liquids. More particularly, the invention relates to filtration and sorption elements and solvent containers for purifying a solvent used in a liquid chromatography system.

BACKGROUND

Advancements in the field of liquid chromatography (LC), including advancements in LC systems and mass spectrometers, have yielded increases in sensitivity and selectivity. Consequently, small amounts of mobile phase impurities that were often not visible on prior generation instruments may now yield observable effects and can interfere with the detection of target analytes. For example, the impurities can be visible as peaks or background noise. In another example, impurities can adversely affect the ionization process for certain analytes and degrade the signal response from the mass spectrometer, resulting in a loss of quantization accuracy of an assay.

Extremely pure solvents are difficult to acquire and can be difficult to maintain over time. For example, the container holding a solvent may release polymeric byproducts or container manufacturing process agents, such as, for example, lubricants, releasing agents, plasticizers, binders, radical initiators, etc., into the solvent. Other sources of impurities include atmospheric contaminants which can diffuse into the solvent container and microbes which can grow inside the solvent container.

SUMMARY

In various aspects, the present inventions provide purification elements comprising a purification media that offer lower operational backpressure. In various embodiments, the purification elements comprise a high surface area-to-volume structure at least a portion of the surface of which is functionalized with a compound selected to interact with a chemical or biological impurity dissolved in the liquid to be purified. Capture of impurities by chemical interaction with the functionalized surface can remove contaminants not normally removed by pass-through filtration based on size exclusion, e.g., by passage through pores in a filter. In addition, as practiced in the present inventions use of filtration media with relatively large size exclusion openings in combination with functionalized surfaces can provide purification with a lower pressure drop than traditional filtration approaches. Chromatographic devices can particularly benefit from various embodiments of the present inventions as fluid stream pressure drop is problematic for the optimal performance of chromatographic devices In various embodiments, the functionalized media of the present inventions have increased filter lifetime and/or are more favorable than traditional solvent filters that operate by size exclusion. In various embodiments, the present inventions achieve these advantages by increasing the external surface area and, in various embodiments, by chemical functionalization of the purification media.

In various embodiments, complex geometrical features are used to increase the purification media surface area without significantly increasing the media volume. In various embodiments, the increased purification media surface area increases the media lifetime and results in a lower operational back pressure.

In various embodiments, at least a portion of the surface the purification media comprises a coating functionalized with a compound selected to interact with a chemical or biological impurity dissolved in the liquid to be purified. Capture of impurities by chemical interaction with the functionalized surface can remove contaminants not normally removed by filtration based on size exclusion, e.g., by passage through pores in a filter. In addition, as practiced in the present inventions use of filtration media with relatively large size exclusion openings in combination with functionalized surfaces can provide purification with a lower pressure drop than traditional filtration approaches. Chromatographic devices can particularly benefit from various embodiments of the present inventions as fluid stream pressure drop is problematic for the optimal performance of chromatographic devices.

In one aspect, the inventions feature a container for dispensing a purified liquid where the container comprises a purification media through which the liquid must pass upon being dispensed. In various embodiments provided is a container configured to hold a volume of a liquid and having an opening to dispense the liquid. A purification module, containing a purification media, is disposed at the opening of the container and configured to receive a flow of the liquid dispensed from the container. The purification media comprise a stack, or array, of microstructured panels, where each panel has a plurality of protrusions disposed on its surface of the panel defining filtering channels when the panels are configured in a stack. The liquid is introduced at a first edge of the stack, flows through at least a portion of the filtering channels, and is dispensed as a purified liquid from a second edge of the stack that is opposite from the first edge of the stack.

In another aspect, the inventions feature a purification media in which at least a portion of the channels in a portion of the panels are coated. The coatings can comprise both inert, with respect to the liquids being purified and any contaminants (both particulate and chemical) therein, and reactive, that is, coatings comprised of materials that are designed to chemically react with a chemical impurity in the liquid being purified. Examples of such chemical interactions include, but are not limited to, hydrophilic interactions, a hydrophobic interaction and a charge exchange interaction. As used herein chemical interactions encompasses both physisorption and chemisorption. Examples of various embodiments of coatings include, but are not limited to, functionalized gold surfaces and derivatized isocyanate surfaces, that, for example, have been derivatized to present to the liquid as it flows through the channel one or more of an alcohol group, amine group, aryl group, carboxylic acid, ether group, methyl group, phenol group, and/or thiol group. Examples of inert coatings include, but are not limited to, fluoropolymers, such as for example polytetrafluoroethylene (PTFE) and fluorinated ethylene propylene (FEP), and organosilanes, such as for example trimethylsilane and dimethylsilane based coatings. In various embodiments the coating may act as and/or comprise a bactericide and/or fungicide.

In another aspect, the inventions feature a solvent delivery system for liquid chromatography comprising a container configured to hold a volume of solvent and having an opening to dispense the solvent. A purification module, containing a purification media, has an inlet in fluidic communication with the opening of the container and which is configured to receive a flow of the solvent dispensed from the container, the solvent flows through the purification media and is dispensed from an outlet in the purification module configured to provide a flow of purified solvent to the inlet of a pump. The pump also having an outlet to provide a pressurized flow of the purified solvent to, for example, a liquid chromatography system. In various embodiments, the purification media is comprised of a plurality of panels each panel having a plurality of protrusions disposed on a surface of the panel, the panels being configured in a stack having a first edge in fluidic communication with the inlet of the purification module and a second edge, opposite the first edge, in fluidic communication with the outlet of the purification module, wherein the protrusions between adjacent panels define filtering channels for a flow of the liquid received at the first edge of the stack and dispensed as a purified liquid from the second edge of the stack.

In various embodiments, suitable base purification media include, but are not limited to those described in U.S. patent application Ser. No. 14/149,620; US Publication No. 2014/0224658, published Aug. 14, 2014, the entire contents of which are herein incorporated by reference.

BRIEF DESCRIPTION OF THE DRAWINGS

The above and further advantages of the inventions may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the inventions.

DETAILED DESCRIPTION

The present teaching will now be described in more detail with reference to embodiments thereof as shown in the accompanying drawings. Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

Liquid chromatography is an example of a field of applications wherein the purity of a liquid is a critical concern. One or more solvents are used to create a flow of a mobile phase for performing a chromatographic separation. If a solvent includes an impurity, the result of the separation can be degraded. In particular, the impurity may be visible as chromatographic peaks, may result in increased background noise or may interfere with a mass spectrometer detection process to compromise the quantitation accuracy. In addition, chromatographic columns can become clogged if a dissolved impurity precipitates in the column. A particle-packed device, such as a chromatographic column, can be adapted for use as a purification media; however, the cost of the device can be prohibitively high for many applications. Moreover, the small particles in a particle-packed device can result in an excessive pressure drop. For example, the excessive pressure drop may prohibit the device from being used to purify a chromatographic solvent as the solvent pump may not be able to draw the solvent from the solvent reservoir.

In brief overview, embodiments of an apparatus for providing a purified liquid described herein include a container configured to hold a liquid and having an opening through which the liquid is dispensed. The apparatus further includes a purification module at the opening of the container. The purification module includes a stack, or array, of microstructures that serve as a purification media and in various embodiments allows for purification without the excessive pressure drop associated with a particle-packed purification media.

Advantageously, the apparatus has a small size, results in a low backpressure and may be manufactured at a cost that is inexpensive relative to various other liquid purification systems. Thus the apparatus is suitable for a wide range of applications. For example, the apparatus may be provided as a disposable unit which can be removed from a chromatographic system and replaced with another unit in a straightforward manner. Moreover, because the liquid is purified at the time of use, contamination of the liquid that occurs at any time, including the time subsequent to adding the liquid to the container, is subject to a purification process. In some embodiments, the apparatus includes a purification module specifically configured to remove a known impurity such as an impurity that leaches from the container material.

In various embodiments, such a known impurity is removed by selecting the height of the protrusions on the panels, that thereby sets the channel depth and various of its filtration properties. In various embodiments, such a known impurity is removed by selecting the height of the protrusions on the panels and the spacing between them, that thereby sets the channel width and depth and various of its filtration properties. In various embodiments, the channels contain a coating designed to adsorb the impurity, e.g., by physisorption and/or chemisorption.

Figure 1:
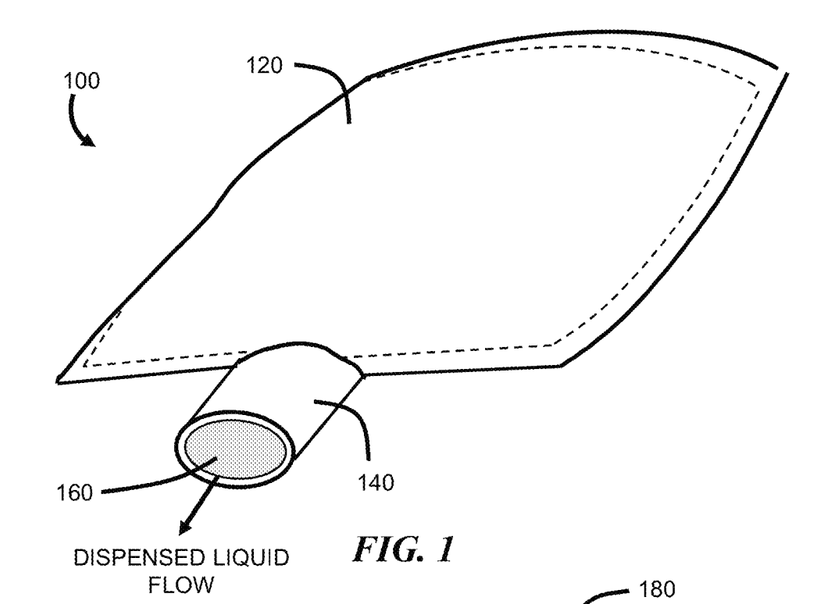
FIG. 1 schematically depicts an embodiment of a flexible purification container that provides a purified liquid when the liquid is dispensed.

FIG. 1 is an illustration of an embodiment of a purification container 100 that provides a purified liquid when the liquid is dispensed. The container 100 includes a container body 120 in the form of a flexible pouch having a nominal "pillow shape" when the volume of liquid in the container 100 is near or at the full volume capacity. The container 100 may be formed of a flexible material such as, but not limited to, a polymer such as polyethylene, polypropylene, Nylon, and fluoropolymers; a metal sheet such as aluminum foil; and their derivatives and composites. The container can be coated with an inert coating. Examples of inert coatings include, but are not limited to fluoropolymers and organosilanes. In one embodiment, the container 100 is formed by sealing two nominally rectangular sheets of material to each other along most of the length of the perimeter of each sheet.

A snout 140 extends from one end of the container body 120. The snout 140 may be formed of a flexible material, such as the same material used for the container body 120, and may have a nominal hollow cylindrical shape. Alternatively, the snout 140 may be formed of a rigid material such as, but not limited to, polymers such as polyethylene, polypropylene, Nylon, fluoropolymer, Teflon, polycarbonate, polyether ether ketone (PEEK); metals such as stainless steel and titanium. Preferably, the materials used for the container body 120 are selected so that minimal contamination of the contained liquid occurs over time and preferably the inside of the container is coated with an inert coating, such as a fluoropolymer or organosilane, to minimize leaching from and reactions with the container body.

A purification module 160 comprising purification media is secured to an outlet of the snout that is opposite to the container body 120. As used herein, a purification media means an element or component of the purification module that purifies a liquid. The purification of the liquid can include removal of contaminants by physical methods. For example, the purification module may filter the liquid to remove contaminant particles that exceed a certain particle size. Alternatively, or in combination with physical purification, the purification module may remove contaminants by one or more chemical processes and/or physical chemical processes, e.g., adsorption, absorption and physisorption. For example, chemical impurities may be removed by molecular interactions between the impurities and a sorbent, through hydrophilic or hydrophobic interactions, or by charge exchange interactions. Chemical impurities may be removed by molecular interactions between the impurities and a coating. An electric potential can be applied to the purification media to affect useful electrochemical reactions.

Figure 2:
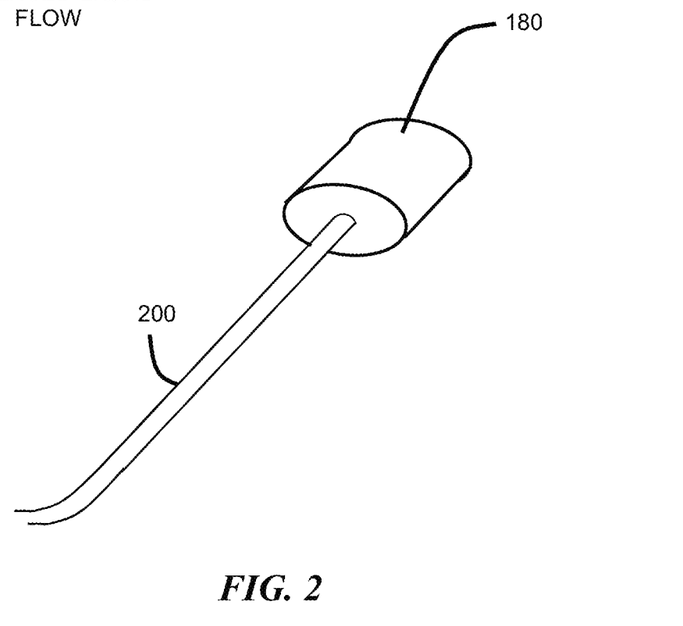
FIG. 2 schematically depicts an embodiment of tubing having a mating socket for connection to the opening of a purification container.
Figure 7:
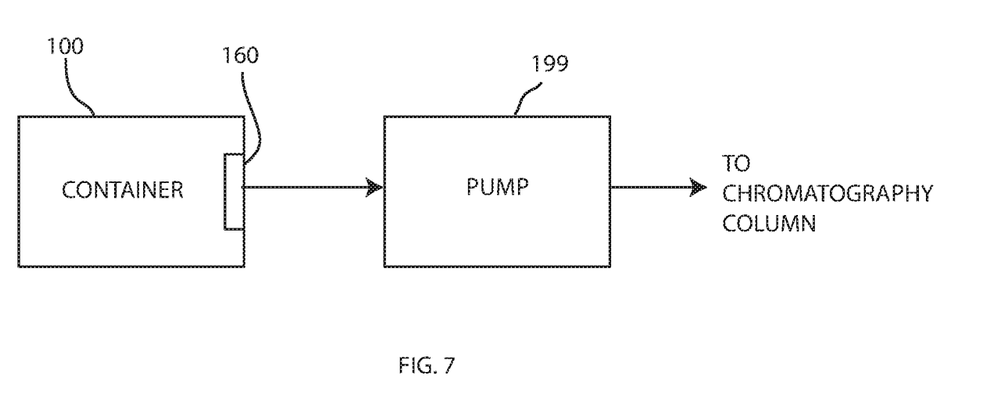
FIG. 7 schematically depicts an embodiment of a liquid chromatography system having the container of FIG. 1 fluidically connected to a pump.

The outlet end of the snout 140 is configured to receive a mating socket (or "mating adapter") which couples the fluid path defined from the container body 120 through the snout 140 and purification module 160 to a tube or other form of conduit. For example, FIG. 2 is an illustration of a mating socket 180 that is attached at one end of a tubing 200 and which can be secured to the outlet of the snout 140. When used in a liquid chromatography system, the tubing 200 can be configured to conduct a solvent dispensed through the purification module 160 to one or more solvent pumps 199, as shown in FIG. 7. The mating socket 180 may include a sealing surface to engage a surface at the end of the snout 140 as is known in the art. The mating socket can be secured in place in a number of ways including, for example, an interference fit or through the use of attachment elements (e.g., screws or clamps) and the like that to establish and maintain a fluid tight seal.

It will be recognized that the shapes of the container body 120, snout 140, purification module 160, mating socket 180 and tubing 200 can be different from those illustrated. For example, the mating socket 180 may be configured for use with different types and sizes of purification containers.

Figure 3A:
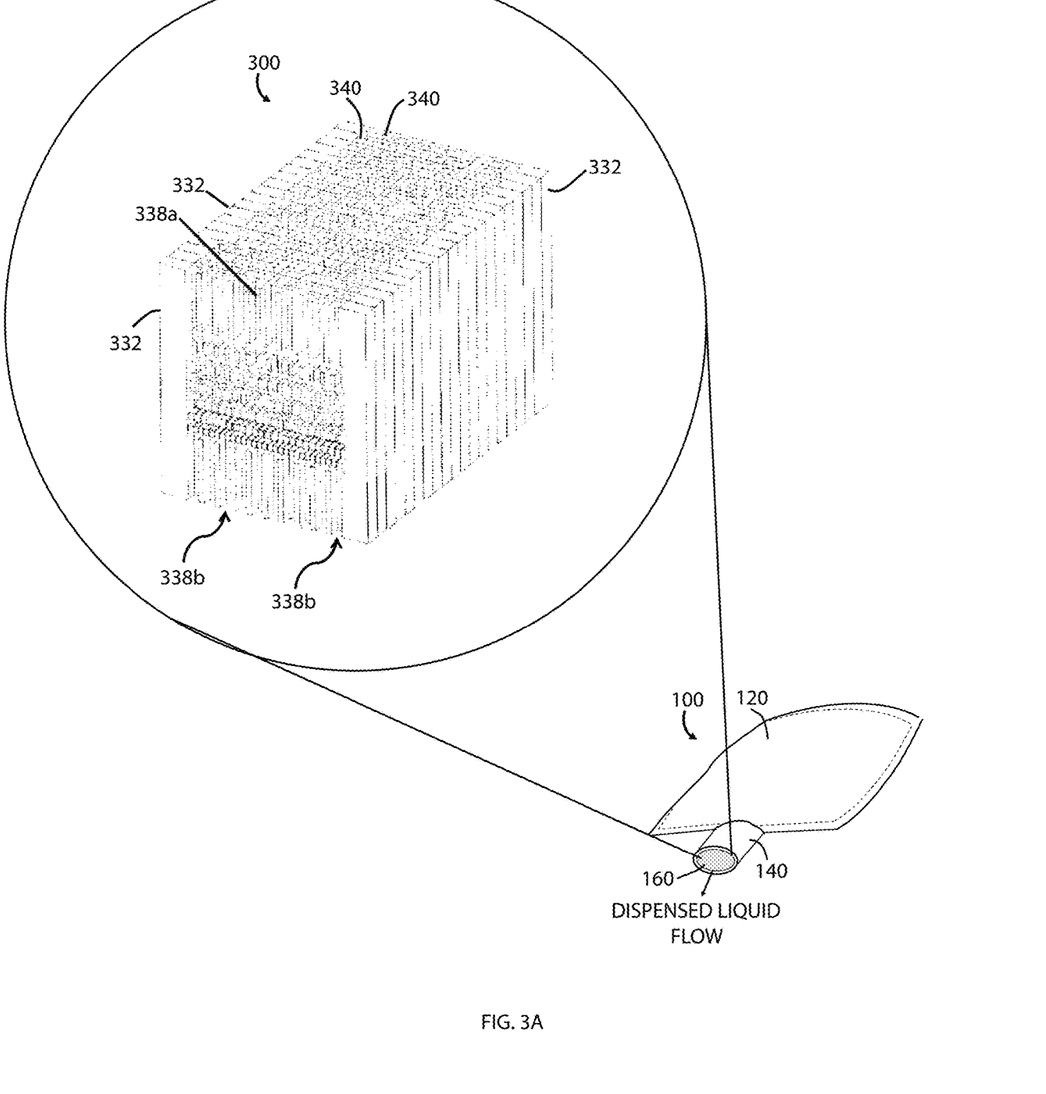
FIGS. 3A and 3B schematically depict various embodiments of purification media.
Figure 3B:
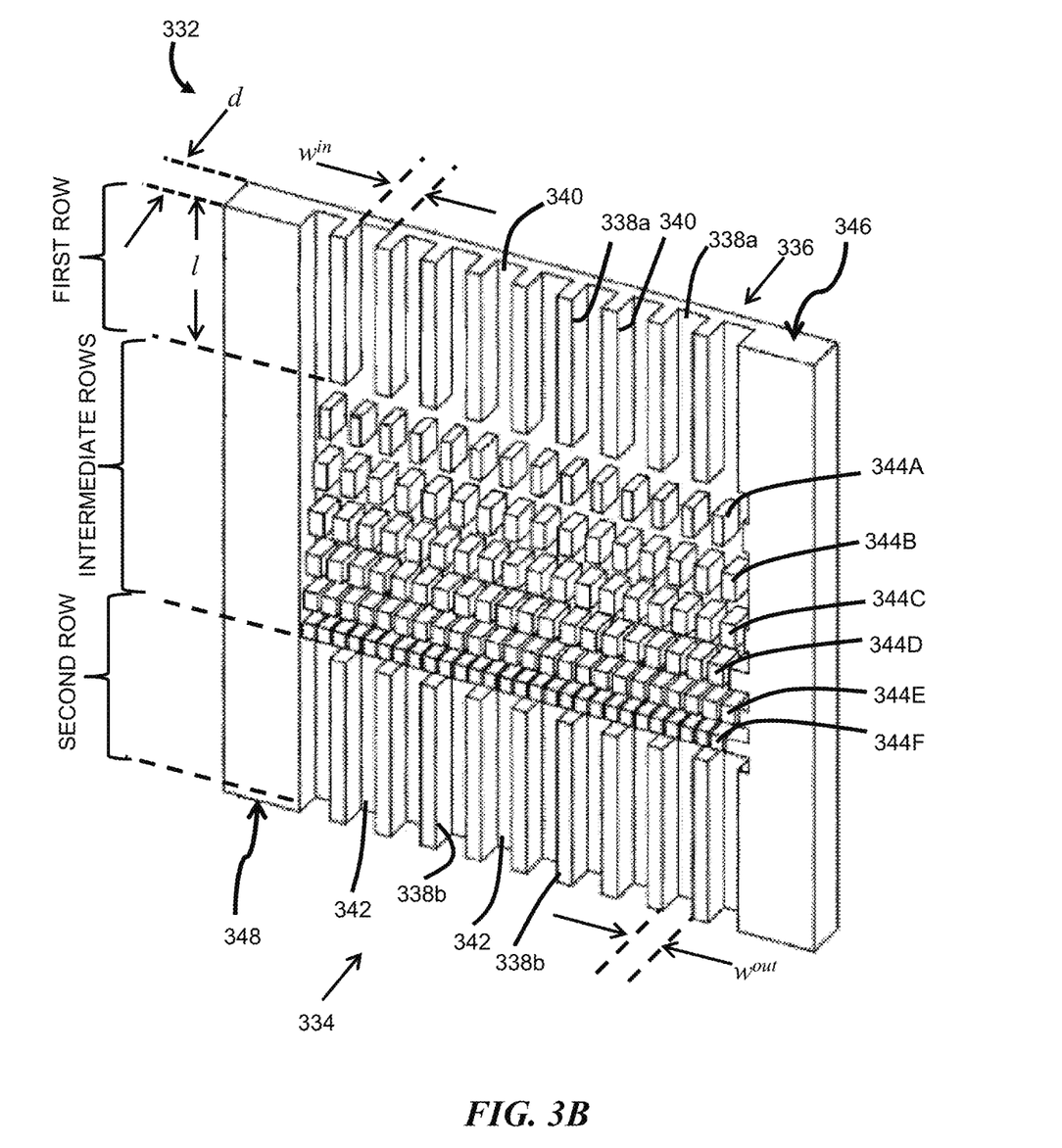

In various embodiments, the purification media of the purification module 160 can be formed as a filtration device according to a lithographic method as described in U.S. patent application Ser. No. 14/149,620. FIG. 3A shows an example of such a purification media 300 which includes a number of panels 332 stacked together. Each panel 332 has a filtering surface 334 and a back surface 336 that is parallel to the filtering surface 334, as shown in FIG. 3B. In other words, FIG. 3B shows a single panel of the filter shown in FIG. 3A, which may be incorporated into the purification module 160. Each filtering surface 334 has a first row of vertically extending protrusions 338a at the top of the panel 332 that are spaced apart from one another by a distance $w^{in}$ to form inlet channels 340. A second row at the bottom of the panel 332 includes vertically extending protrusions 338b that are spaced apart from one another by the distance $w^{out}$ to form outlet channels 342. Multiple intervening rows of filtering protrusions 344A to 344F (six rows as shown, generally 344) are disposed between the first and second rows of vertically extending protrusions 338a, 338b. The horizontal spacings of the filtering protrusions 344 in the intervening rows are approximately constant within each row. The protrusions 344 are formed to have spacings at values that are progressively smaller from top to bottom and which are formed to capture particles or molecules having a size that exceeds the respective spacing value. The vertically extending protrusions 338 and filtering protrusions 344 also serve to filter out particles having a particle size that exceeds their depth d. By way of a non-limiting numerical example, the filtration device 300 may be configured to remove bacteria, for example, by using spacings for capturing particles of equivalent size (e.g., 0.2 μm size).

The panels 332 are stacked together such that the filtering surface 334 of one panel is in contact with the back surface 336 of an adjacent panel. The inlet edge and outlet edge of the filtration device 300 are defined by the top edges 346 and bottom edges 348, respectively, of the panels 332 and includes a two-dimensional array of input and output channels 340 and 342, respectively.

The depth d, spacing w and length l of the rows of vertically extending protrusions 338 and the intervening rows may differ according to the specific requirements for the purification module. In some embodiments, the purification module can include a filtration device having panels formed with different geometries. For example, the depths d or spacings w between protrusions 338 or 344 can vary within a row. In other embodiments, the panels 332 are not planar. For example, the filtration device may be formed from concentric cylindrical panels of different diameters or as a single spiral channel.

In various embodiments depths d between approximately 10 nanometers (0.01 microns) to approximately 100 nanometers (0.1 microns); approximately 0.1 microns to approximately 0.3 microns; and/or approximately 0.1 microns to approximately 5 microns are used.

In various embodiments channel widths w between approximately 10 microns to approximately 50 microns; approximately 50 microns to approximately 150 microns; and/or approximately 100 microns to approximately 500 microns are used.

In various embodiments, the purification media of the purification module 160 is a high surface area-to-volume ratio media, which, for example, can be formed of star sphere particles, pyramid foams, pulmonary alveolus-like configurations, fractal-like configurations, and the like. FIGS. 3C-3F provide schematic illustration of various embodiments employing such high surface area-to-volume ratio purification media. It is to be understood that the various features in FIGS. 3C-3F are not to scale, for example, the surface convolution of the purification media are exaggerated to better illustrate the concepts of various aspects and embodiments of the present invention.

As used in the present inventions, such high surface area-to-volume ratio purification media provides, for a given volumetric pumping rate, a lower linear fluid flow velocity across the purification media and providing a decrease in back pressure. In various embodiments, the decrease in the linear velocity described also has a benefit as a chemical reactor, and, in various embodiments, at least a portion of the surface is coated with a layer of material that interacts with impurities dissolved in the liquid. The impurities can be chemical, biological or both.

In various aspects, the high surface area-to-volume ratio purification media as used in the present inventions provide improved removal of dissolved impurities when used with a reactive surface material because the fluid passes through the media more slowly, it stays longer in the media (if the thickness of the media remains the same) and thus increases the chance of impurities in the moving fluid to encounter and interact with material and thus effect the impurities removal from the fluid. The slow flow can result in a small pressure drop across the media, and thus in various embodiments can ensure sufficient pressure-head at the pump inlet to avoid cavitation.

In various embodiments, the filter surface interacts with an impurity. For example, the filter surface can be manufactured out of or with a reactive material, can be coated with a reactive material, or both. An interaction may be a molecular interaction between an impurity and a sorbent material. Alternatively, or in addition to use of a sorbent, a hydrophilic interaction, hydrophobic interaction or charge exchange interaction may occur between the coating material and an impurity to affect the removal of the impurity from the flow of liquid through the filtration device. The interactions can be both through physical and/or chemical sorption.

Coatings such as, but not limited to, functionalized gold surfaces and derivatized isocyanate surfaces can chemically interact with various impurities to affect their removal. For example, isocyanate surfaces can be derivatized with a wide variety of functional groups including, but not limited to alcohol groups, amine groups, aryl groups, carboxylic acid, ether groups, methyl groups, phenol groups, and thiol groups. In various embodiments, the coating comprises activated charcoal, graphite, and/or graphene.

Figures 3C, 3D:
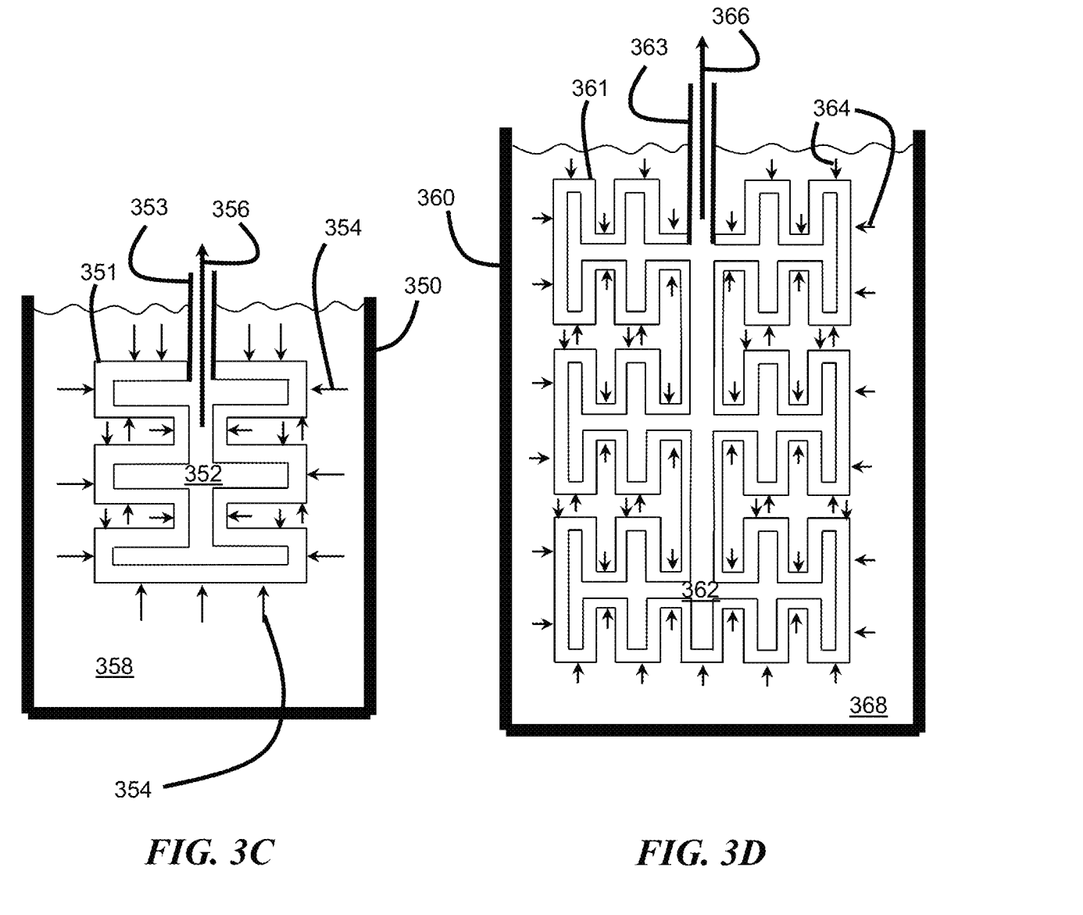
FIGS. 3C and 3D schematically depict various embodiments of purification media with various embodiments of purification containers having an internal tube through which liquid is dispensed.

Referring to FIG. 3C, in various embodiments a container 350 (cover not shown for clarity) for dispensing a purified liquid comprises a purification media 351 having a high surface area to volume ratio. Fluid 358 in the container 350 flows (in the direction indicated by the arrows 354) through the media into its interior 352 which is in fluid communication with a fluid outlet 353, such as a tube or other conduit, configured to dispense purified liquid from the container 350 in the direction 356.

Referring to FIG. 3D, in various embodiments a container 360 (cover not shown for clarity) for dispensing a purified liquid comprises a purification media 361 having a high surface area to volume ratio, for example, by employing a highly branched structure. Fluid 368 in the container 360 flows (in the direction indicated by the arrows 364) through the media into the interior 362 which is in fluid communication with a fluid outlet 363, such as a tube or other conduit, configured to dispense purified liquid from the container 360 in the direction 366.

Figures 3E, 3F:
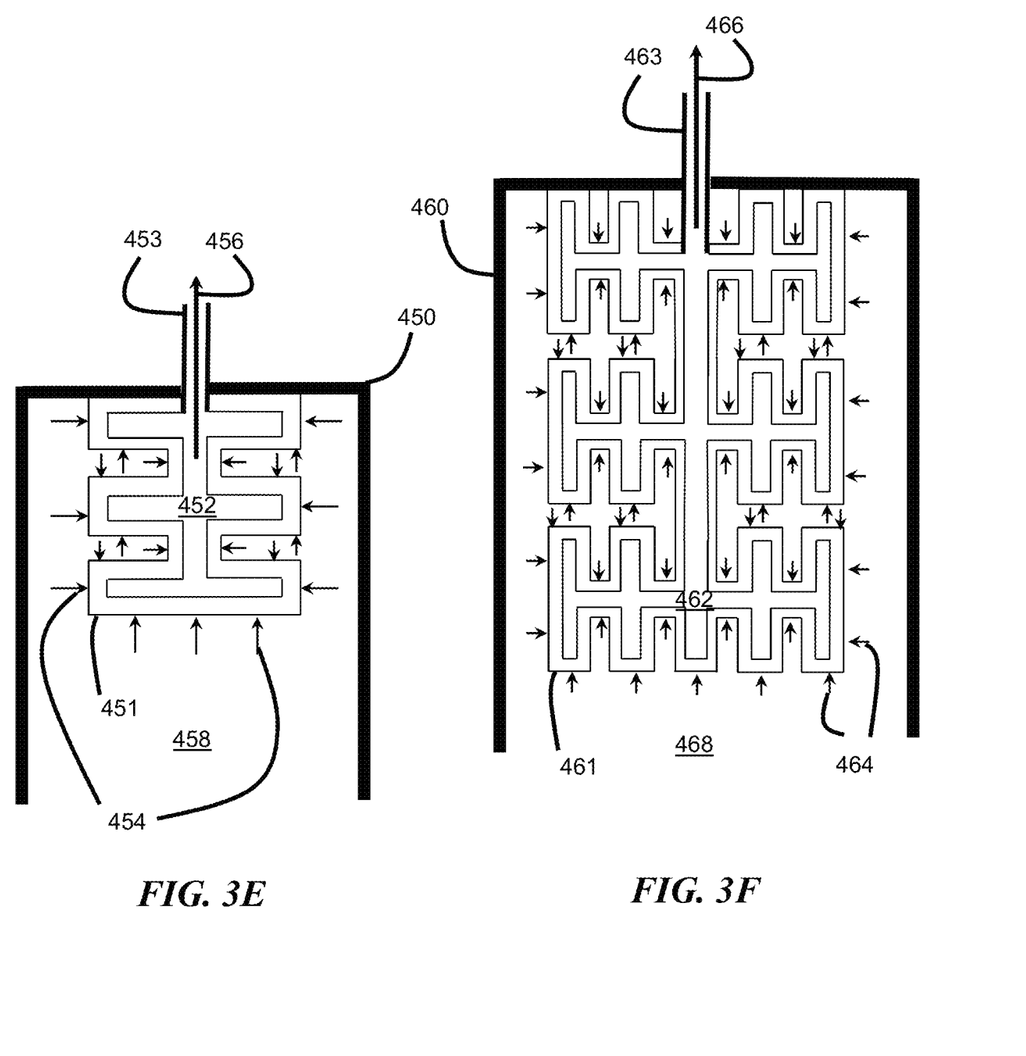
FIGS. 3E and 3F schematically depict various embodiments of purification media configured to reside in the end of a fluid conduit.

Referring to FIG. 3E, in various embodiments a purification module 450 comprises a purification media 451 having a high surface area-to-volume ratio. Fluid 458 from, for example, a container flows (in the direction indicated by the arrows 454) through the media 451 into its interior 452 which is in fluid communication with a fluid outlet 453, such as a tube or other conduit, configured to dispense purified liquid in the direction 456.

Referring to FIG. 3F, in various embodiments a purification module 460 comprises a purification media 461 having a high surface area to volume ratio, for example, by employing a highly branched structure. Fluid 468 from, for example, a container flows (in the direction indicated by the arrows 464) through the media 461 into its interior 462 which is in fluid communication with a fluid outlet 463, such as a tube or other conduit, configured to dispense purified liquid in the direction 466.

In various embodiments, at least a portion of the surface of the filtration media is coated with a layer of material that interacts with impurities in the liquid. For example, in the media of FIGS. 3A and 3B at least a portion of at least one of the filtering surface 334 and back surface 336 is coated. For example, in the media of FIGS. 3C-3F at least a portion of the filter media is coated, on one or more of the external surface, within the media itself, and internal surface with a layer of material that interacts with impurities in the liquid. An interaction may be a molecular interaction between an impurity and a sorbent material. Alternatively, or in addition to use of a sorbent, a hydrophilic interaction, hydrophobic interaction or charge exchange interaction may occur between the coating material and an impurity to affect the removal of the impurity from the flow of liquid through the filtration device. The interactions can be both through physical and/or chemical sorption.

Coatings such as, but not limited to, functionalized gold surfaces and derivatized isocyanate surfaces can chemically interact with various impurities to affect their removal. For example, isocyanate surfaces can be derivatized with a wide variety of functional groups including, but not limited to alcohol groups, amine groups, aryl groups, carboxylic acid, ether groups, methyl groups, phenol groups, and thiol groups. In various embodiments, the coating comprises activated charcoal, graphite, and/or graphene.

In some embodiments the purification media is formed as a stack of filtration devices in which each filtration device is used to remove a subset of the total number of impurities removed from the liquid. For example, two or more filtration devices may be used with each filtration device being coated with a different material. Also, for example, two or more filtration devices may be used where each filtration device employs different depth d, spacing w and/or length l of the rows of vertically extending protrusions to filter out particles of different sizes, such as a first filtration device configured to remove larger particulates than a following filtration device. Also, for example, a series of filtration device can be configured such that certain devices are configured to remove particulate impurities and others in the stack chemical impurities.

Figure 4A:
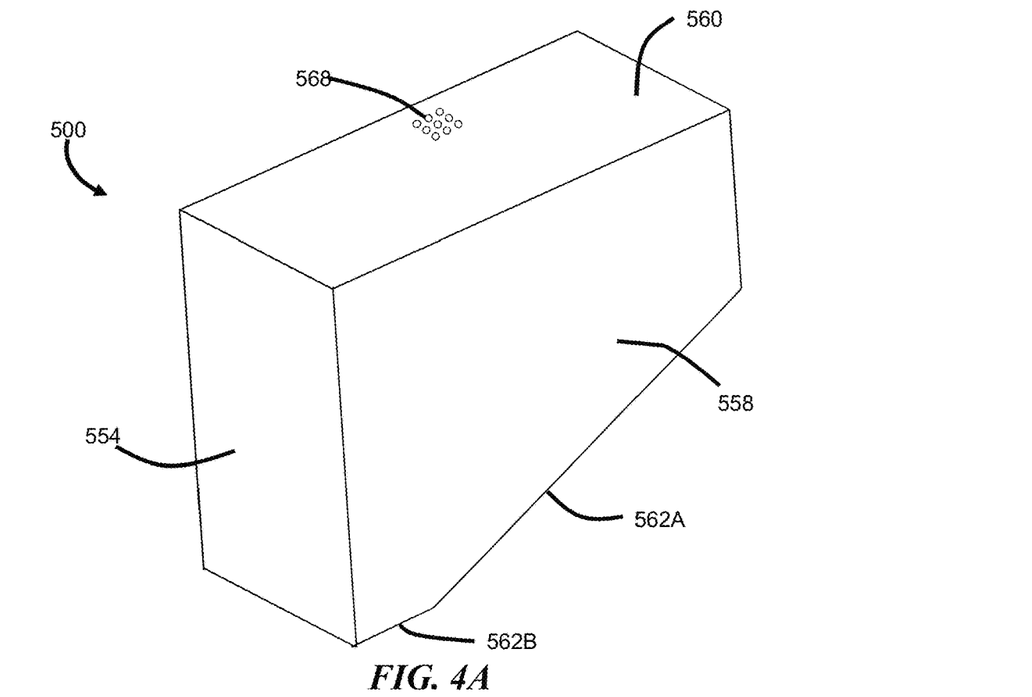
FIGS. 4A, 4B and 4C schematically depict an embodiment of a purification container configured to dispense liquids by gravity feed.
Figure 4B:
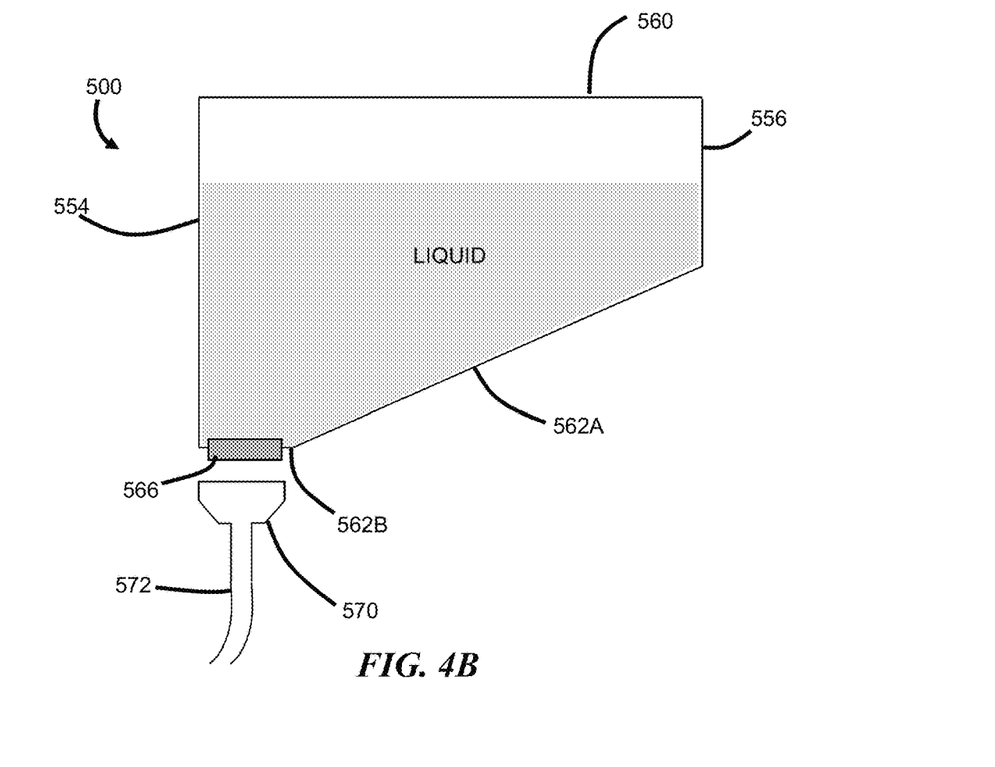
Figure 4C:
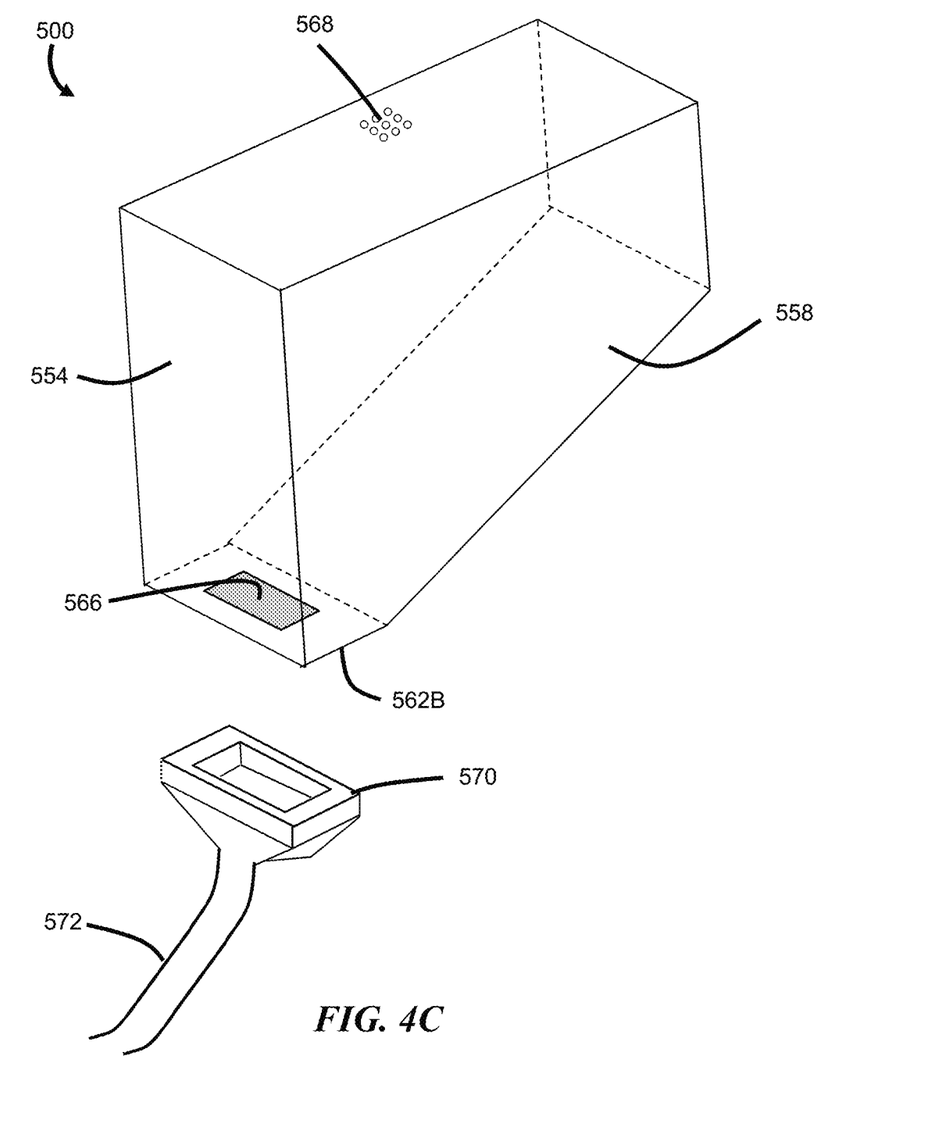

FIG. 4A, FIG. 4B and FIG. 4C show a perspective view, cross-sectional side view and perspective see-through view, respectively, of another embodiment of a purification container 500 that uses a gravity feed to dispense a purified liquid. The purification container 500 includes a rigid container body having a front surface 554, back surface 556, side surfaces 558 and top surface 560. The purification container 500 also includes a two-part bottom 562 that includes an inclined section 562A and flat section 562B. The container body may be formed of a rigid material such as, but not limited to, polymers such as polyethylene, polypropylene, Nylon, fluoropolymer, Teflon, polycarbonate, polyether ether ketone (PEEK); metals such as stainless steel and titanium, and glass. In a preferred embodiment, the container body is formed from plastic using a molding process.

The inclined section 562A ensures that more of the enclosed liquid can be dispensed from the container body via a gravity feed than would otherwise be possible using a single flat bottom. A purification module housing the purification media 566 is attached at an opening in the flat section 562B. A set of vent holes ("breathing holes") 568 in the top surface 560 enables air to vent into the internal volume of the purification container 500 so that a vacuum is not formed when liquid is dispensed. Preferably a gas-permeable element (not shown) is attached to the top surface 560 directly above or below the holes 568 to seal against particulate contamination. All liquid dispensed from the container 500 passes through the purification media of purification module 566 and is therefore purified.

The purification module 566 includes purification media such as that described with respect to FIGS. 3A and 3B so that liquid is purifies as it is dispensed. Thus the purification module 566 may, for example, filter the liquid to remove contaminant particles that exceed a certain particle size. Alternatively, or in combination with physical purification, the purification module may remove contaminants by one or more chemical methods as described herein.

In use, a mating socket 570 (or mating adapter) is secured to the flat section 562B at the opening to create a fluid tight seal between tubing 572 and the purification container 500. In one application, the tubing 572 is used to conduct a solvent from the purification container 500 to one or more solvent pumps in a liquid chromatography system. The mating socket 570 can be secured to the container body using known techniques such as by interference fit or the use of attachment elements (e.g., screws) and the like. When the volume of liquid held in the purification container 500 is depleted or reduced to an unacceptable volume, liquid can be added to the container for subsequent use. Alternatively, the purification container 500 can be replaced by removing the mating socket 570, discarding the empty container and attaching the mating socket 570 to another purification container holding a volume of liquid for subsequent use.

In other embodiments, the purification container may have a different shape. Preferably, the opening and purification module are disposed along a bottom surface of the container and vent openings for air flow into the container are provided on a top surface to enable an efficient gravity feed of liquid.

Figure 5A:
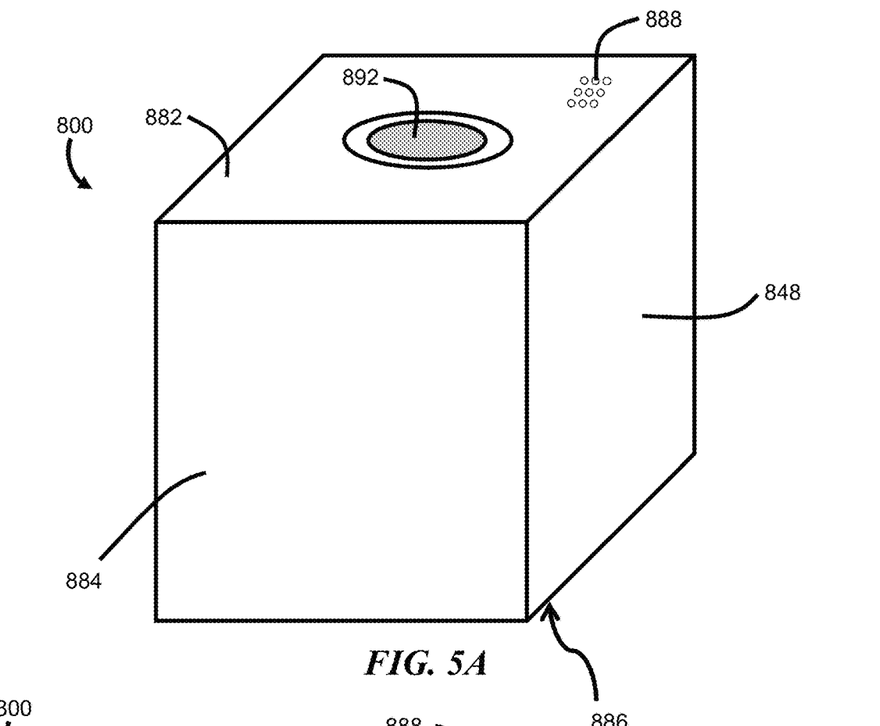
FIGS. 5A, 5B and 5C schematically depict an embodiment of a purification container having an internal tube through which liquid is dispensed.
Figure 5B:
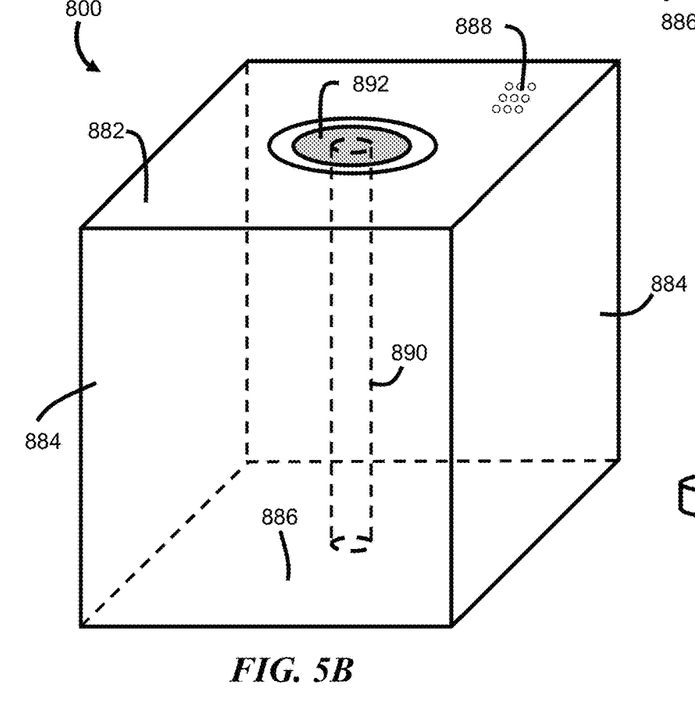

FIG. 5A and FIG. 5B show a perspective view and a perspective see-through view, respectively, of an embodiment of a purification container 800 that provides a purified liquid when the liquid is dispensed. The purification container 800 has a box-shaped container body that includes a top surface 882, side surfaces 884 and a bottom surface 886 opposite and parallel to the top surface 882. A set of breathing holes 888 in the top surface 882 enables air to vent into the container 800 so that the flow of the dispensed liquid is not impeded by development of an internal vacuum. The upper end of a vertically-oriented tube 890 is sealed circumferentially along its outer surface to the top surface 882. The opposite end of the tube 890 is disposed above the bottom surface 886 to allow liquid to flow into the tube 890. The container body may be formed of a material similar to that described above for the purification container 500 of FIG. 4A.

Figure 5C:
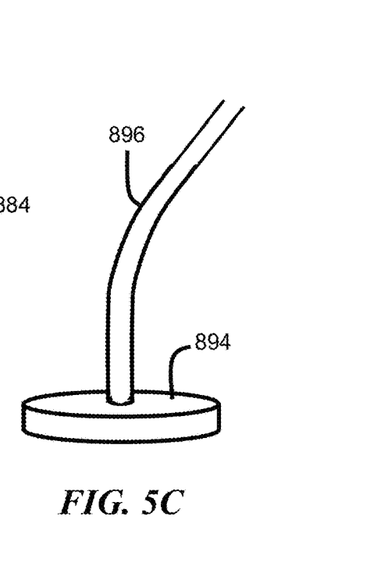

A purification module comprising a purification media 892 is secured in or adjacent to the open end of the tube 890 at the top surface 882. Referring to FIG. 5C, a mating socket 894 (or fluidic mating connector) couples with the purification module 892 at the upper end of the tube 890 and provides a fluid-tight seal for the liquid flow path that extends through the tube 890 and the purification module 892, and into tubing 896. The purification module 892 includes purification media, such as described above in reference to FIGS. 3A and 3B, that purifies liquid at the location at which the liquid is dispensed from the container.

Figure 6A:
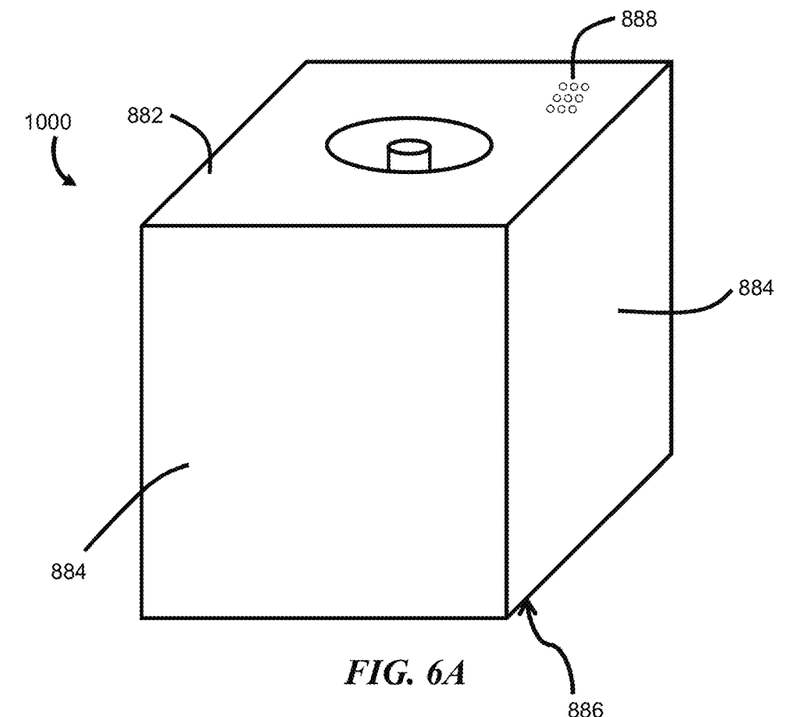
FIGS. 6A and 6B schematically depict an embodiment of a purification container having an internal tube through which liquid is dispensed.
Figure 6B:
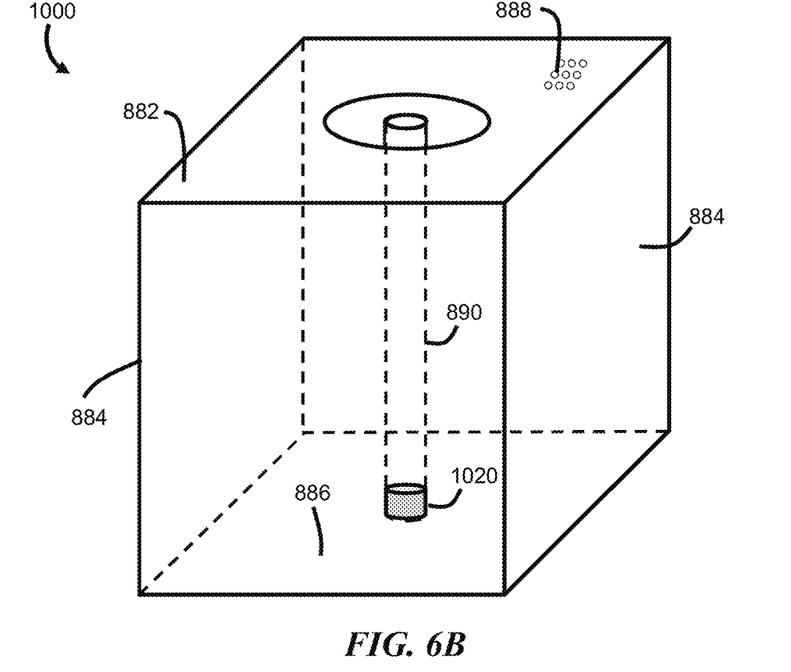

FIG. 6A and FIG. 6B show a perspective view and a perspective see-through view, respectively, of an alternative embodiment of a purification container 1000. The container 1000 is similar to the purification container 800 of FIG. 5A and FIG. 5B; however, a purification module containing purification media 1020 is located at the bottom end of the tube 890. A mating socket similar to that shown in FIG. 5C can be used to attach to and seal the top of the tube 890 to a tube or other conduit to receive the purified liquid dispensed from the container 1000.

While the invention has been shown and described with reference to specific preferred embodiments, it should be understood by those skilled in the art that various changes in form and detail may be made therein without departing from the spirit and scope of the invention as defined by the following claims. For example, the purification container can have a different shape and size, and the location of the purification module in or on the container can vary from those described herein.

The invention claimed is:

1. A solvent delivery system for liquid chromatography, comprising:
   a purification container for dispensing a solvent in a liquid chromatography system, comprising:
   a container body configured to hold a volume of a solvent and having a single opening to dispense the solvent into a liquid chromatography system, wherein the container body is an enclosed body; and
   a purification module disposed in the opening of the container body and configured to receive a flow of the solvent dispensed from the container body,
   the purification module containing a purification media, wherein at least a portion of a surface of the purification media comprises a material designed to chemically interact with an impurity in the solvent, wherein the purification module does not include a draw-up tube within the enclosed container body; and a pump having a pump inlet in fluidic communication with the outlet of the purification module to receive the flow of purified solvent from the purification module and having a pump outlet to provide a pressurized flow of the purified solvent.

2. The solvent delivery system of claim 1 wherein the purification media comprises a plurality of panels each panel having a plurality of protrusions disposed on a surface of the panel, the panels being configured in a stack wherein the protrusions between adjacent panels define filtering channels for a flow of the solvent received at a first edge of the stack and dispensed as a purified solvent from a second edge of the stack opposite the first edge of the stack.

3. The solvent delivery system of claim 2 wherein a height of the protrusions and a spacing of the protrusions defines a particle size to be filtered from the solvent.

4. The solvent delivery system of claim 2 wherein a height of the protrusions from each of the panels is in a range from approximately 10 nanometers to approximately 100 nanometers.

5. The solvent delivery system of claim 2 wherein a height of the protrusions from each of the panels is in a range from approximately 0.1 microns to approximately 5 microns.

6. The solvent delivery system of claim 1 wherein the material designed to chemically interact with an impurity in the solvent comprises a coating on at least a portion of the purification media.

7. The solvent delivery system of claim 6 wherein the coating comprises a material that chemically interacts with the chemical impurity by one or more of a hydrophilic interaction, a hydrophobic interaction and a charge exchange interaction.

8. The solvent delivery system of claim 6 wherein the coating comprises a material that chemically interacts with a biological impurity in the solvent.

9. The solvent delivery system of claim 6 wherein the coating comprises a derivatized isocyanate that presents one or more of an alcohol group, amine group, aryl group, carboxylic acid, ether group, methyl group, phenol group, or thiol group to the solvent.

10. A liquid chromatography system comprising:
   the solvent delivery system of claim 1; and
   a chromatography column located downstream from the solvent delivery system.

* * * * *

UNITED STATES PATENT AND TRADEMARK OFFICE
CERTIFICATE OF CORRECTION

PATENT NO. : 11,125,729 B2
APPLICATION NO. : 16/223330
DATED : September 21, 2021
INVENTOR(S) : Jung et al.

It is certified that error appears in the above-identified patent and that said Letters Patent is hereby corrected as shown below:

In the Claims

Column 10, Line 56 (Claim 1):
Replace "a" with "the" in the phrase "a liquid chromatography system,".

Signed and Sealed this
Twenty-fourth Day of May, 2022

Katherine Kelly Vidal
*Director of the United States Patent and Trademark Office*